US 11,055,560 B2

(12) United States Patent
Florencio et al.

(10) Patent No.: US 11,055,560 B2
(45) Date of Patent: Jul. 6, 2021

(54) UNSUPERVISED DOMAIN ADAPTATION FROM GENERIC FORMS FOR NEW OCR FORMS

(71) Applicant: Microsoft Technology Licensing, LLC, Redmond, WA (US)

(72) Inventors: Dinei Afonso Ferreira Florencio, Redmond, WA (US); Cha Zhang, Bellevue, WA (US); Gil Moshe Nahmias, Seattle, WA (US); Yu-Yun Dai, Duvall, WA (US); Sean Louis Goldberg, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 110 days.

(21) Appl. No.: 16/413,244

(22) Filed: May 15, 2019

(65) Prior Publication Data
US 2020/0160086 A1 May 21, 2020

Related U.S. Application Data

(60) Provisional application No. 62/770,435, filed on Nov. 21, 2018.

(51) Int. Cl.
*G06K 9/46* (2006.01)
*G06N 5/04* (2006.01)
(Continued)

(52) U.S. Cl.
CPC ............ *G06K 9/46* (2013.01); *G06K 9/6256* (2013.01); *G06N 5/04* (2013.01); *G06K 2209/01* (2013.01); *G06N 20/00* (2019.01)

(58) Field of Classification Search
None
See application file for complete search history.

(56) References Cited

U.S. PATENT DOCUMENTS

| 10,395,133 B1* | 8/2019 | Flament ............... G06K 9/4652 |
| 2013/0124414 A1* | 5/2013 | Roach ................... G06Q 20/10 |
| | | 705/44 |

(Continued)

OTHER PUBLICATIONS

Ahmed, et al., "A Generic Method for Automatic Ground Truth Generation of Camera-captured Documents", In Proceedings of the Computing Research Repository, May 4, 2016, 15 Pages.
(Continued)

*Primary Examiner* — Vikkram Bali
(74) *Attorney, Agent, or Firm* — Davin Chin; Chin IP, PLLC

(57) ABSTRACT

The disclosed technology is generally directed to optical text recognition for forms. In one example of the technology, line grouping rules are generated based on the generic forms and a ground truth for the generic forms. Line groupings are applied to the generic forms based on the line grouping rules. Feature extraction rules are generated. Features are extracted from the generic forms based on the feature extraction rules. A key-value classifier model is generated, such that the key-value classifier model is configured to determine, for each line of a form: a probability that the line is a value, and a probability that the line is a key. A key-value pairing model is generated, such that the key-value pairing model is configured to predict, for each key in a form, which value in the form corresponds to the key.

20 Claims, 11 Drawing Sheets

(51) Int. Cl.
    *G06K 9/62*         (2006.01)
    *G06N 20/00*        (2019.01)

(56) References Cited

U.S. PATENT DOCUMENTS

2020/0042645 A1*   2/2020   Douthit ................. G06Q 40/10
2020/0050845 A1*   2/2020   Foncubierta Rodriguez ..............
                                                                         G06K 9/00456

OTHER PUBLICATIONS

"International Search Report and Written Opinion Issued in PCT Application No. PCT/US2019/059942", dated Feb. 17, 2020, 12 Pages.
Smith, Ray, "An Overview of the Tesseract OCR Engine", In Proceedings of the Ninth International Conference on Document Analysis and Recognition, vol. 2, Sep. 23, 2007, 5 Pages.
Strecker, et al., "Automated Ground Truth Data Generation for Newspaper Document Images", In Proceedings of the International Conference on Document Analysis and Recognition, Jul. 26, 2009, pp. 1275-1279.

* cited by examiner

UNSUPERVISED DOMAIN ADAPTATION FROM GENERIC FORMS FOR NEW OCR FORMS

CROSS-REFERENCE TO RELATED APPLICATION(S)

This application claims priority to U.S. Provisional Pat. App. No. 62/770,435, filed Nov. 21, 2018, entitled "UNSUPERVISED OCR FORM TRAINING". The entirety of this afore-mentioned application is incorporated herein by reference.

BACKGROUND

Typically, many business processes still use forms and printed material, and conversion back to digital from can often be unreliable.

Optical Text Recognition (OCR) may be used to convert a document into text. However, OCR by itself does not determine which text corresponds to which fields. When performing OCR on forms and attempting to determine which text corresponds to which field, in order to achieve reliable results, it may typically be required that a specific location be provided for each field, and it may typically be required that a substantially uniform form be used, in order to make the determination.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to optical text recognition for forms. In one example of the technology, optical text recognition is performed on a plurality of generic forms. In some examples, line grouping rules are generated based on the plurality of generic forms and a ground truth for the plurality of generic forms. In some examples, the ground truth includes, for each form of the plurality of forms, key-value pairs for the form. In some examples, line groupings are applied to the plurality of generic forms based on the line grouping rules. In some examples, feature extraction rules are generated based on the plurality of generic forms and the ground truth for the plurality of generic forms. In some examples, features are extracted from the plurality of generic forms based on the feature extraction rules. In some examples, a key-value classifier model is generated based on the extracted features, the plurality of generic forms, the applied line groupings, and the ground truth for the plurality of forms, such that the key-value classifier model is configured to determine, for each line of a form: a probability that the line is a value, and a probability that the line is a key. In some examples, a key-value pairing model is generated based on the extracted features, the plurality of generic forms, the applied line groupings, and the ground truth for the plurality of forms, such that the key-value pairing model is configured to predict, for each key in a form, which value in the form corresponds to the key.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
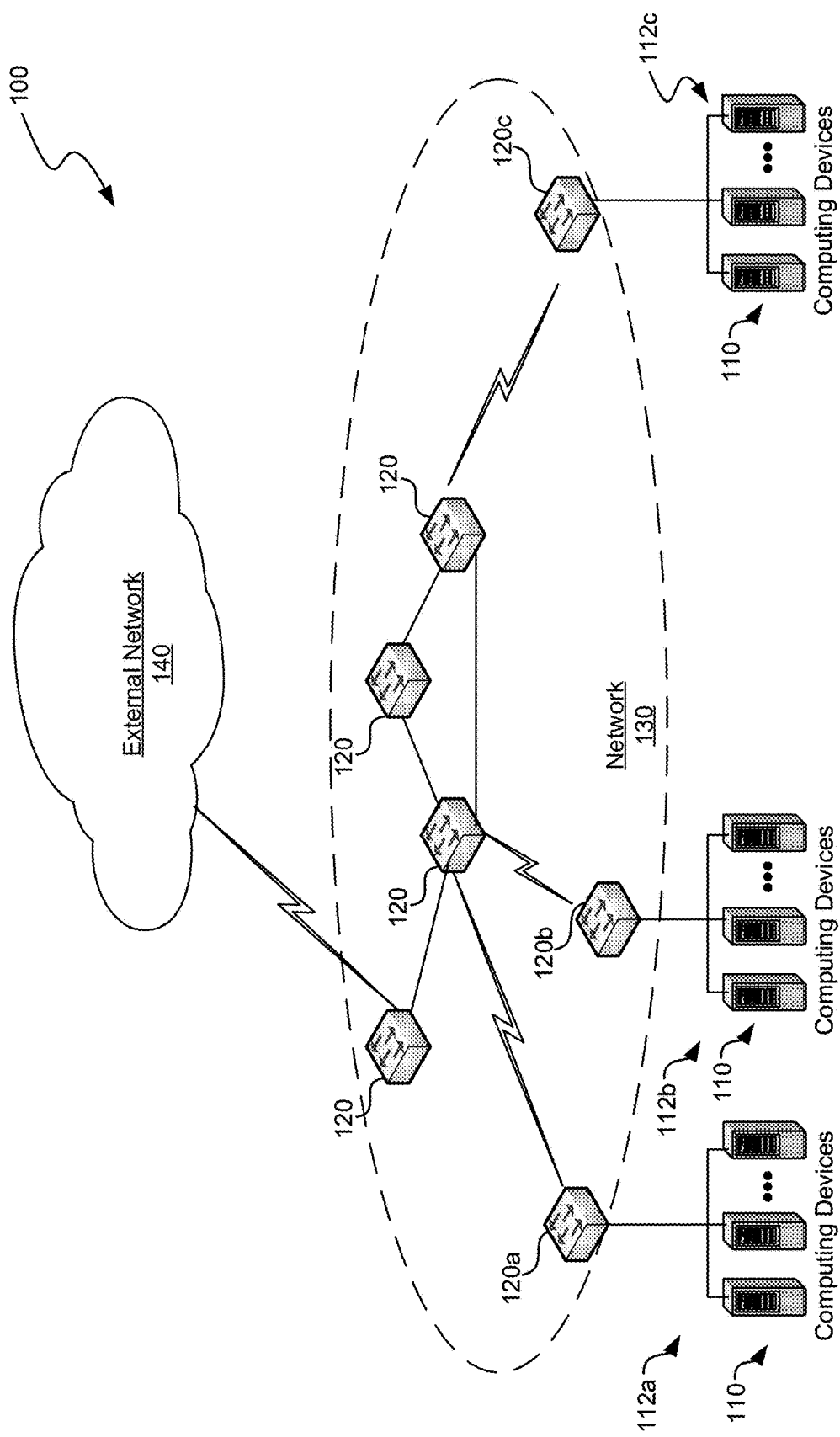
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to optical text recognition for forms. In one example of the technology, optical text recognition is performed on a plurality of generic forms. In some examples, line grouping rules are generated based on the plurality of generic forms and a ground truth for the plurality of generic forms. In some examples, the ground truth includes, for each form of the plurality of forms, key-value pairs for the form. In some examples, line groupings are applied to the plurality of generic forms based on the line grouping rules. In some examples, feature extraction rules are generated based on the plurality of generic forms and the ground truth for the plurality of generic forms. In some examples, features are extracted from the plurality of generic forms based on the feature extraction rules. In some examples, a key-value classifier model is generated based on the extracted features, the plurality of generic forms, the applied line groupings, and the ground truth for the plurality of forms, such that the key-value classifier model is configured to determine, for each line of a form: a probability that the line is a value, and a probability that the line is a key. In some examples, a key-value pairing model is generated based on the extracted features, the plurality of generic forms, the applied line groupings, and the ground truth for the plurality of forms, such that the key-value pairing model is configured to predict, for each key in a form, which value in the form corresponds to the key.

OCR may be performed for a form, generating key-value pairs for the form, even where no ground truth exists for the type of form being OCR'ed, and where no training has been performed for the type of form being OCR'ed. In some examples, the keys are elements for which users wish to know corresponding values based on the input form. For instance, an example key might be "customer name" and the corresponding value might be "John Smith." As another example, an example key might be "invoice date" and the corresponding value might be "May 7, 2018." As another example, an example key might be "balance due" and the corresponding value might be "$984.96."

The OCR process may use a key-value classifier model and a key-value pairing model that have both been trained a priori based on generic forms from other sources. OCR may be performed on the form, and the form may be broken into lines, with each line being classified with the probability that the line is a key and a probability that the line is a value, by the key-value classifier that was trained a priori based on generic forms. Next, the key-value pairing model that was trained a priori based on generic forms may be used to determine, for each line that was determined likely to be a key, what the corresponding value is likely to be for the key. Based on this, in some examples, the key-value pairing model outputs predicted key-value pairs for the form.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

Figure 4:
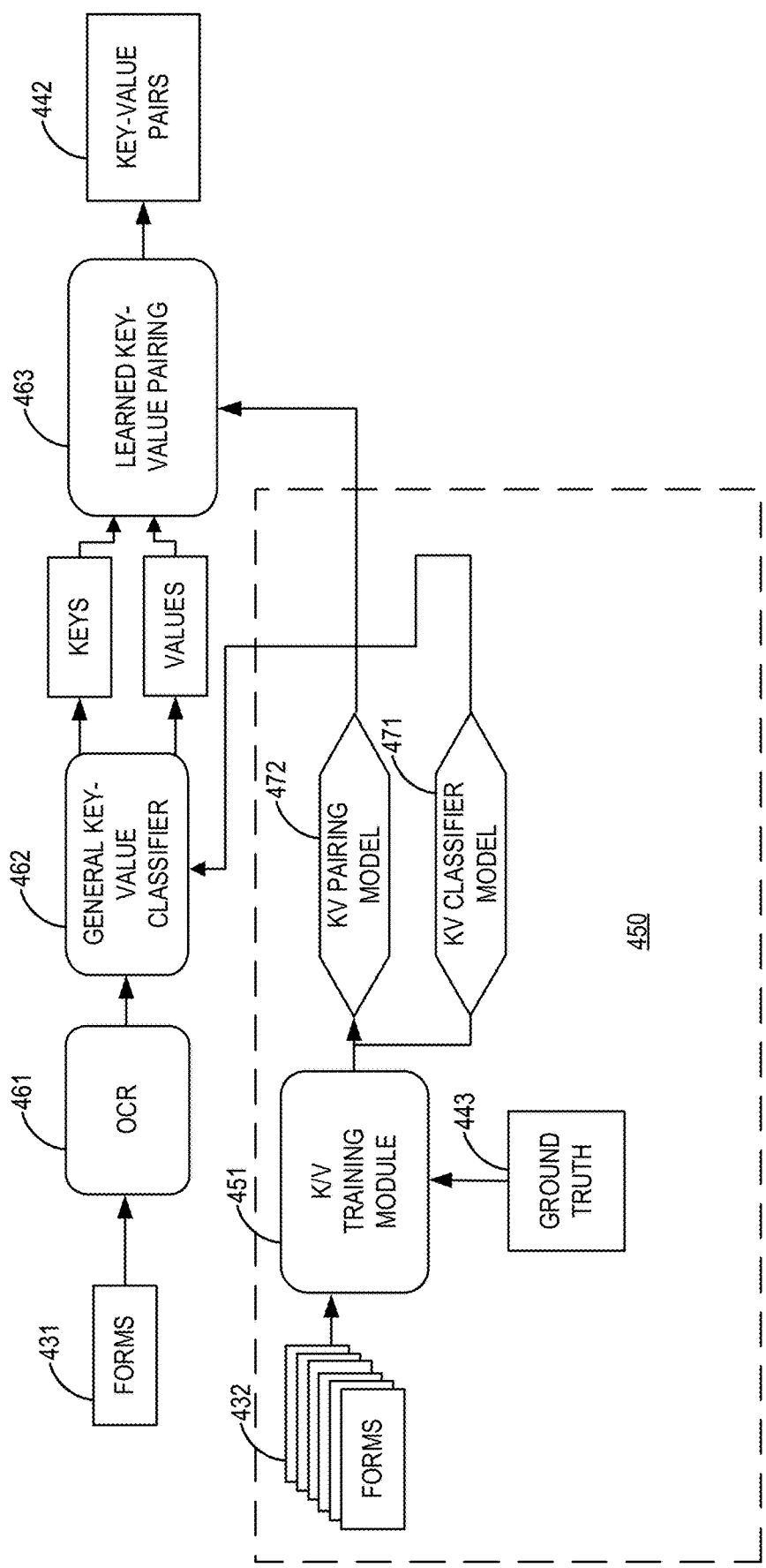
FIG. 4 is a functional block diagram illustrating an example system for form OCR key-value extraction from a single new form.
Figure 5:
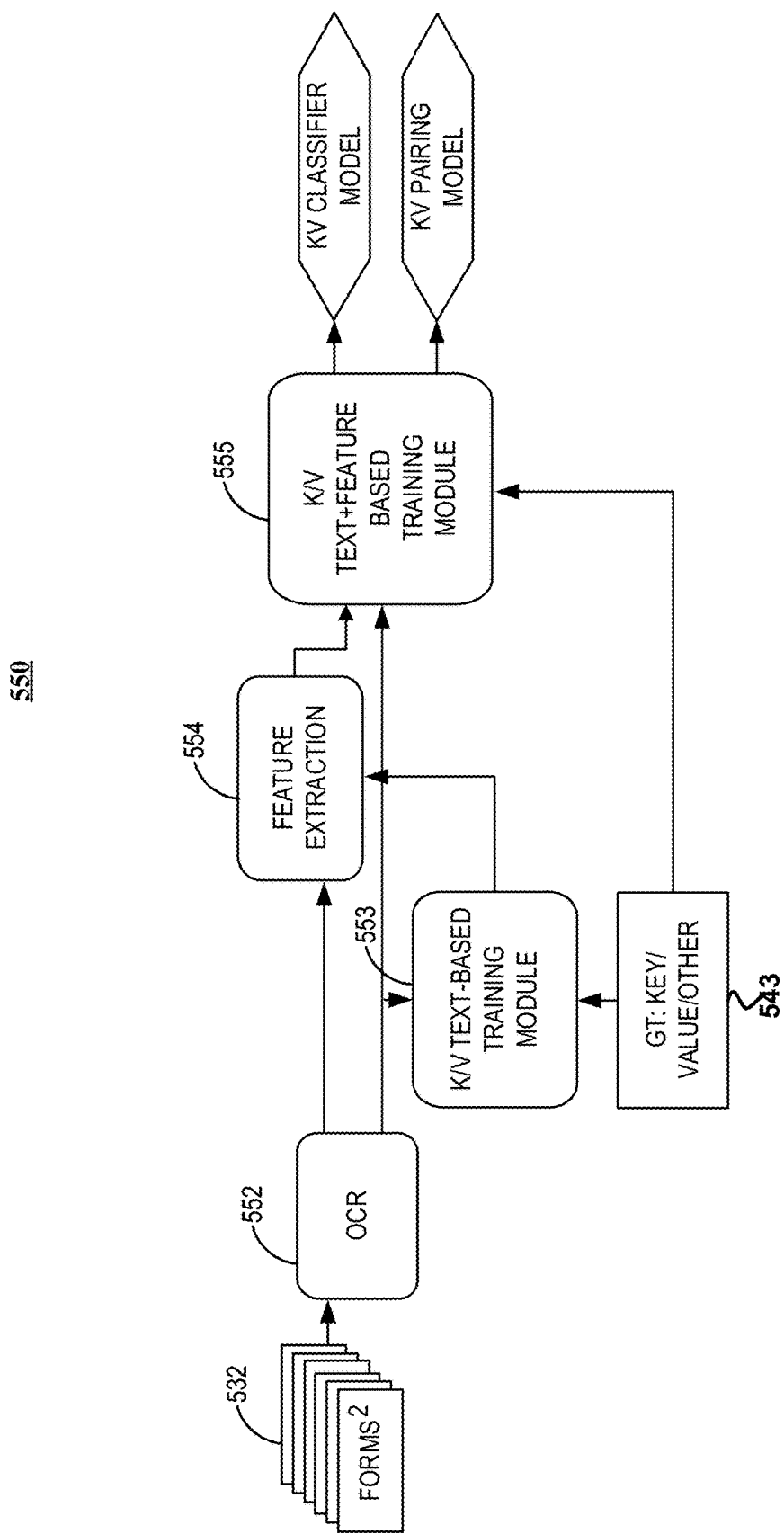
FIG. 5 is a functional block diagram illustrating an example system for key-value extraction training for use in form OCR of a single form.

In some examples, one or more of the computing devices 110 is may perform one or more of the processes as illustrated in FIG. 4, FIG. 5, and/or FIG. 6, as discussed in greater detail below.

Illustrative Computing Device

Figure 2:
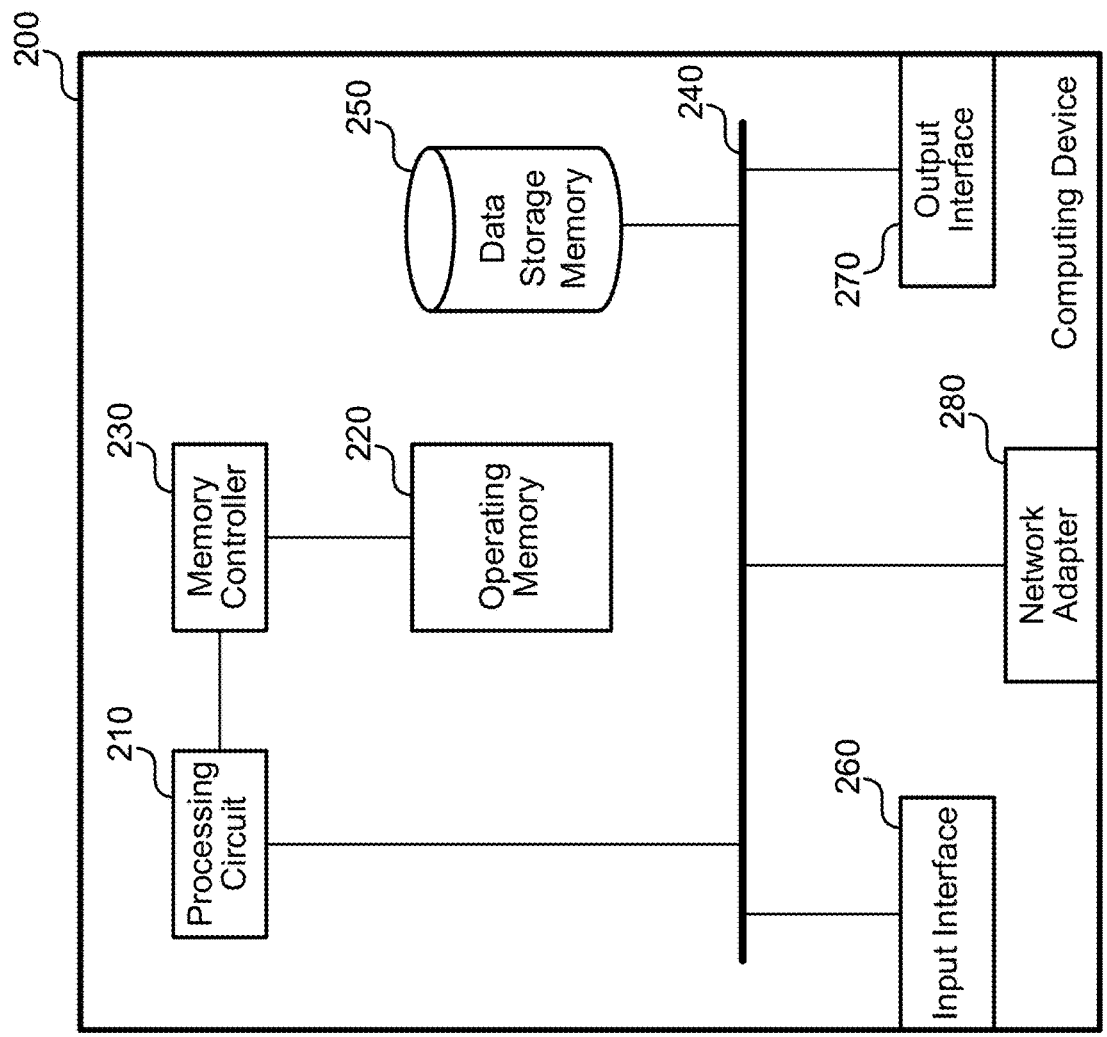
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device 110 or network node 120 of FIG. 1. Likewise, computer device 200 may be an example any of the devices illustrated in or referred to in FIGS. 3-5, as discussed in greater detail below. As illustrated in FIG. 2, computing device 200 includes processing circuit 210, operating memory 220, memory controller 230, data storage memory 250, input interface 260, output interface 270, and network adapter 280. Each of these aforelisted components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. Processing circuit 210 is an example of a core. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process. In some examples, other forms of execution may be employed, such as execution directly from data storage component 250, e.g., eXecute In Place (XIP).

Operating memory 220 may include 4th generation double data rate (DDR4) memory, 3rd generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudorandom random access memory (PSRAM), or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 210 via memory controller 230 in channels. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter ("UART"), a Serial Peripheral Interface ("SPI"), Inter-Integrated Circuit ("I2C"), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL)

adapter. Network adapter 280 may also include a wireless network adapter, for example, a Wi-Fi adapter, a Bluetooth adapter, a ZigBee adapter, a Long Term Evolution (LTE) adapter, SigFox, LoRa, Powerline, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions, such as, for examples, one or more of the processes discussed in greater detail below.

Illustrative System

Figure 3:
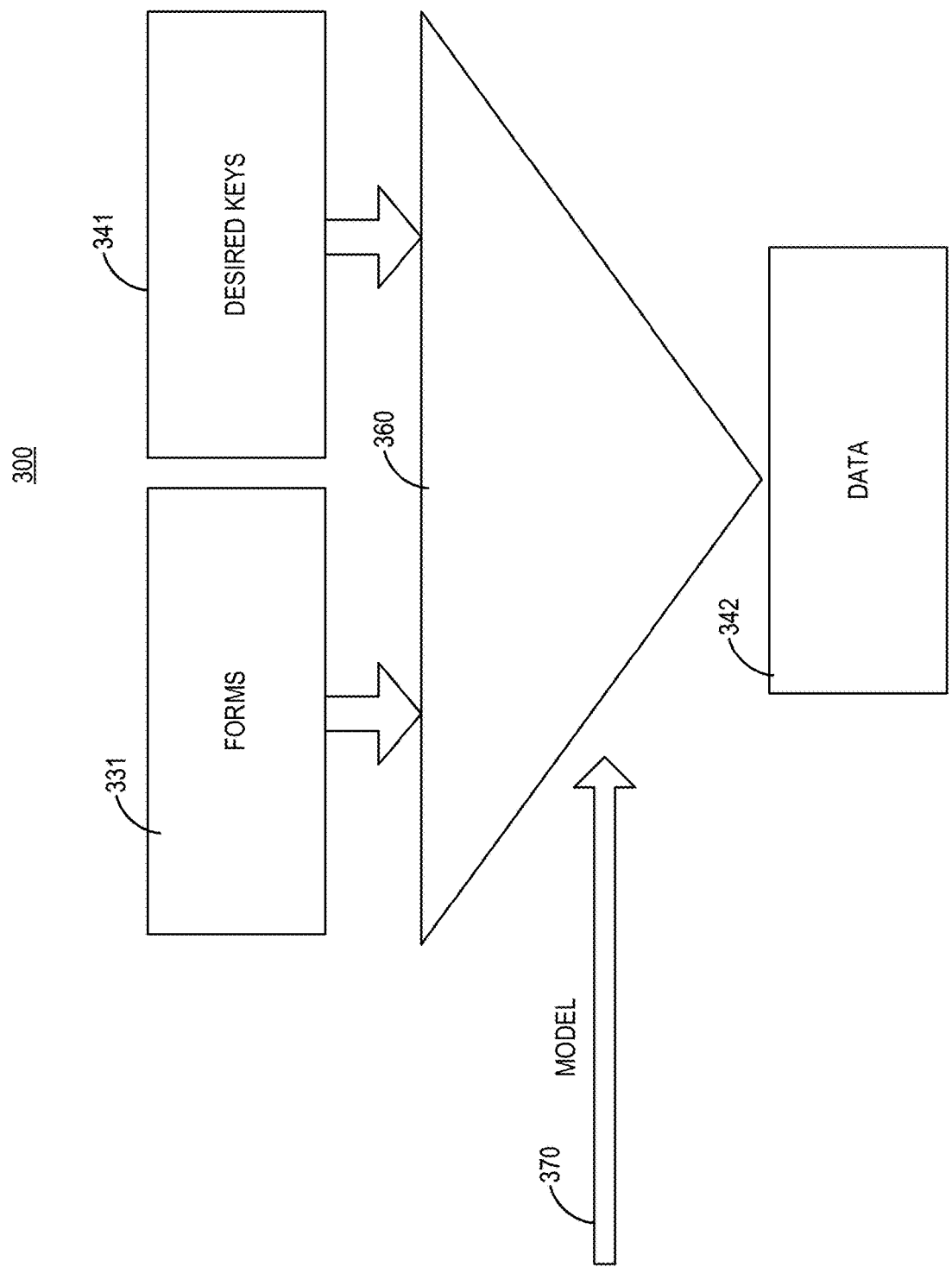
FIG. 3 is a functional block diagram illustrating an example of a system.

FIG. 3 is a functional block diagram of an example system 300. System 300 may include forms 331, desired keys 341, model 370, service pipeline 360, and results (data) 342.

System 300 may be used to perform OCR on at least one form for which the user wishes to also know the values of particular keys as part of the output of the OCR process. The keys for which the user wishes to know the values to may be input as desired keys 341. For example, forms may include customer name, and for such forms, the user may wish to know what customer name is indicated on a particular form, and so output "customer name," the key, along with the corresponding value for the customer name indicated on the form. There may be several such key-value pairs in each form that users wish to be output by the OCR process. If no desired keys are provided, in some examples, system 300 will predict keys likely to be desired. Desired keys may also be referred to as a key list.

Model 370 may include a key-value classifier model and a key-value pairing model.

In some examples, forms 331 are forms for which the OCR process is to be performed along with key-value determinations made. The OCR'ed form and key-value determination may be generated as part of results 342 from forms 331 and desired keys 341, with the determination made by service pipeline 360 using model 370 as part of results 342. In some examples, model 370 includes a key-value classifier model and a key-value pairing model, with the models of model 340 generated a priori based on training performed on generic forms from sources other than the source of forms 331. Results 342 may also include an expected accuracy, such as the probability for each key-value determination that the key-value pair is correct. The process can also be performed on a single form 331 in some examples. Results 342 may also include an expected confidence of each individual prediction in results 342, for example, the expected confidence that the key is a key, the expected confidence that the value is a value, and the expected confidence that that value corresponds to that particular key.

FIG. 4 is a functional block diagram illustrating an example system (400) for form OCR key-value extraction of a single form (431), and a training pipeline 450. System 400 may include OCR block 461, general key-value classifier block 462, and key-value pairing block 463. Training pipeline 450 may include key-value training module 451.

Forms along with a corresponding ground truth for the type of form to be OCR'ed by system 400 may be unavailable. However, it may be possible to obtain completely generic forms, such as generic forms from the Internet, with corresponding ground truths, for use in training. In some examples, system 400 uses domain adaptation for identifying key-value pairs based on training performed on generic forms, as opposed to training based on data of the source type with a corresponding ground truth, where such source data with corresponding ground truth is not available.

Training pipeline 450 may perform a priori training based on generic forms 432. Generic forms 432 may be from any source, including generic forms found on the internet or from any other suitable source. In some examples, ground truth 443 includes a correct key-value pair for each of the forms in generic forms 432. In some examples, key-value training module 451 is configured to generate key-value classifier model 471 and key-value pairing model 472 from generic forms 432 and ground truth 443.

OCR block 461 may be configured to perform OCR on form 431. General key-value classifier block 462 is configured to predict keys and values from OCR'ed form 431. In some examples, general key-value classifier block uses a key list input by the user to assist in the classification. In other examples, no key list is provided by the user, and instead general key-value classifier block 462 predicts the keys. In some examples, general key-value classifier block 462 is based on a general key-value classifier—general in that it is not specific to the type of form, but rather is based on a general form model trained a priori based on generic forms.

In some examples, key-value pairing block 463 is configured to predict, based on model 471, for each key predicted by general key-value classifier block 462, the corresponding predicted value among the predicted values from general key-value classifier block 462, outputting the predicted key-value pairs 442. Key-value pairing block 462 may make the pairing from OCR'ed form 431 based on general key-value pairing model 472. In some examples, general key-value classifier block 463 is based on a general key-value pairing model 472—general in that it is not specific to the type of form, but rather is based on a general form model trained 472 based on generic forms 432.

FIG. 5 is a functional block diagram illustrating an example system (550) for training for use in OCR of a single form. System 550 may be an example of training pipeline 450 of FIG. 4. System 550 may include OCR block 552, key-value text-based training module block 553, feature extraction block 554, and key-value text and feature based training module 555.

System 550 may perform a priori training based on generic forms 532. Generic forms 532 may be from any source, including generic forms found on the Internet, or any other suitable source. In some examples, ground truth 543 includes a correct key-value pair for each of the forms in generic forms 532. OCR block 552 may perform OCR on generic forms 532. In some examples, the OCR performed by OCR block 552 may include both general text decoding, and form-adaptive text decoding based, in part, on ground truth 543.

Block 553 may perform multiple functions on OCR'ed generic forms 532 based on ground truth 543. Block 553 may perform post-processing that is form-adaptive based on ground truth 543. The post-processing may include generating line grouping rules based on OCR'ed generic forms 532 and ground truth 543. Line grouping rules may include rules on how lines are grouped, including line break rules.

The post-processing may also include applying line breaks to OCR'ed generic forms 532 based on the line break rules. Line grouping rules may also include line merge rules.

In some examples, learning line breaks from the data includes, given the training data, finding break points that separate keys from values, where the keys and values for the forms are known based on ground truth 543. A line may have one word, or may have more than one word. In some examples, this is accomplished by first finding the "values" in the text of the form, as indicated as such according to the ground truth 543. A list called, for example, List A may be generated, and text previous to the determined values may be added to list A. Next, in some examples, for each element in List A, the element is removed from List A if the element contains any ground "values" other than at end of ground value (this would break those values into two fields). Next, in some examples, List A is used to split lines into two lines (fields). The line break model may learn that there is a high likelihood that a line break should occur after certain words like "City" or "customer name" or "DOB."

In some examples, the line grouping rules may include both rules for line breaking and rules for line merging, or may be a more general processing for determining how the lines are to be grouped. In some examples, the lines are first broken into words or characters, and subsequently merged into new lines. In some examples, the output of the line grouping may be a preferred configuration of line groups, upon which subsequent steps such as feature extraction act upon. In some examples, the multiple possible line groupings may be output, each grouping being a different variation of particular mergings and breakings of the lines. In some examples, each of the different variations may be acted upon with feature extraction and other steps, with each one generating its own possible keys and values to be chosen from among. In some examples, the line grouping step may be a discrete step, with line groupings being determined first, outputting text that is divided into lines, with subsequent steps such as feature extraction performed out the OCRed text grouped as determined by the line grouping. In some examples, instead of being discrete steps, line grouping and feature extraction are both performed, but are performed together. In these examples, determinations on line grouping and the extraction of features may both be performed, but performed together on the input text rather than as discrete steps. In this way, for example, line groupings may be determined in part based on how features would be extracted from the input text, and vice versa.

In some examples, the ground truth extraction rules generated by block 553 are generic rules, that are not based upon the particular type of form. The service pipeline may perform OCR and determine key-value pairs on a single form which is likely of a different type than any of the generic forms 553. Accordingly, in these examples, the ground truth extraction rules are based on general form principles but not based on any particular type of form.

Feature extraction block 554 may generate feature extraction rules from OCR'ed forms 532, based also on the determined lined breaks, and ground truth 543. Feature extraction block 554 may also extract features from OCR'ed forms 532 and the determined line groupings based on feature extraction rules and ground truth 543.

In some examples, the terms "feature" here is used in the machine learning sense, where a feature is an individual measurable property of the form. Features are the inputs of the machine learning in these examples. The type of features used as inputs to the machine learning may be important to effective machine learning. For example, it would be possible to just literally input each pixel as features, but that may not result in machine learning as effective as would be the case by using higher level features.

Feature extraction rules may involve a variety of different types of feature extraction, including, for example, syntactic information extraction, visual feature extraction, and the generation of heuristic rules. Syntactic information extraction may include, for example, information extracted from the actual makeup of the text itself, and applying features based on the actual makeup of the text itself. The syntactic information may also include applying language models to the text to generate features. In some examples, the generated feature extraction rules include extraction rules associated with syntactic information associated with text in generic forms 533, the generated extraction rules include rules associated with at least one heuristic rule applied to generic forms 533, and the generated extraction rules include rules associated with visual features associated with generic forms 533. The feature extraction rules may also make use of graph-based information, including, in some examples, a graph-convolutional network.

Features may include text, number of letters, relative font properties such as relative font size to nearest known key, relative font type, alignment to nearest known key, and/or the like. Features may also include word embeddings. It may be determined that a particular field parses as a date, or to something similar to a date. Word embeddings may be used to determined associations between fields. Features may include rules, such as whether something on the page includes particular text character, particular groupings of text characters with respect to each other, whether a bounding box is located on a particular part of the page and/or relative to other bounding boxes, and/or the like.

In some examples, the feature extraction rules may involve a large-scale feature collection processing a feature vector about the text of a separate vector comprised of visual features and other heuristic features. While it was discussed above that line group may occur before feature extraction with feature extraction performed based on the determined line groups, in some example, the determination of line groups and the feature extraction are both performed, but are both performed together as one step rather than as steps that are discrete from each other. In this way, in some examples, the model includes the forms and ground truth is its inputs, and provides key-values pairs as its output, without using discrete intermediate outputs between stages.

In some examples, the feature extraction rules generated by feature extraction block 554 are generic rules, that are not based upon the particular type of form. The service pipeline may perform OCR and determine key-value pairs on a single form which is likely of a different type than any of the generic forms 553. Accordingly, in these examples, the feature extraction rules are based on general form principles but not based on any particular type of form.

Block 553 may also perform layout analysis and table parsing for use by the line groupings rules and the feature extraction rules. For instance, based on the training of many generic forms 553, it may be determined based on the layout that a list is present. Based on layout analysis, it may be determined for example, that a particular field is the header, another region includes customer information, another field indicates where the address will be indicated, with another field having a table that includes information organized a table, and so on.

In some examples, block 553 is not discrete from other steps such as feature extraction and line group determination, but rather in some examples is combined together with feature extraction and line group determination.

In some examples, block 555 is configured to generate a key-value classifier model based on the extracted features, the OCR'ed forms 532, the applied line groupings, and ground truth 543. Block 555 may generate the key-value classifier model such that the key-value classifier model is configured to determine, for each line of a form: a probability that the line is a value, and a probability that the line is a key. In some examples, the key-value classifier model generated by block 555 is a generic model, that is not based upon the particular type of form. The service pipeline may perform OCR and predict key-value pairs for a single form which is likely of a different type than any of the generic forms 553. Accordingly, in these examples the key-value classifier model is based on general form principles but not based on any particular form format.

The generic key-value classifier model may learn that certain lines are very likely to be a key, and that lines in certain formats are very likely to be a value. For example, the generic key-value classifier model may learn that "DOB" is very likely to be a key, and that a line in a format such as "Jun. 1, 1979" is very likely to be a value. Features such as relative font size, font type, vocabulary, alignment, and text features may also be used as part of the generic key-value classifier model to determine the probability that a particular line is a key or a value.

For instance, the model may conclude that if particular lines determined to be keys have a particular font size, font type, and alignment, and that particular lines determined to be values have a different particular font size, font type, and alignment, then for a line having a particular font size, font type, and alignment matching those of the existing keys or the existing values, this fact may be used to determine that the line corresponds to the label (key or value) matching those having a similar font size, font type, and alignment.

In some examples, block 555 is further configured to generate a key-value pairing model based on the extracted features, the OCR'ed forms 532, the applied line groupings, and ground truth 543. Block 555 may generate the key-value classifier model such that the key-value pairing model is configured to predict, for each key in a form, which value in the form corresponds to the key. The key-value pairing model generated by block 555 is a generic model, that is not based upon the particular type of form. The service pipeline may perform OCR and determine key-value pairs on a single form which is likely of a different type than any of the generic forms 553. Accordingly, in these examples, the key-value pairing model is based on general form principles but not based on any particular form format.

For instance, in generating the generic key-value pairing model, the default assumption may be that, for each element assigned as a field, the nearest upper-left key is attributed to form a key-value pair. In some examples, this is not universally the case, but can serve as a good initial assumption across any type of form, while also considering other factors to determine whether this is true in a particular case. The generic model may learn that certain "classes of keys" (e.g., addresses, DOB, Customer, PO #, ZIP, etc.) have typical formats, and may use the key "typical format" to ensure that the correct value is attributed. The generic training may also learn a "key under line" as exception—using clear keys and formats (line above) to decide if all values should be attributed to lower key, instead of upper key.

Figure 6:
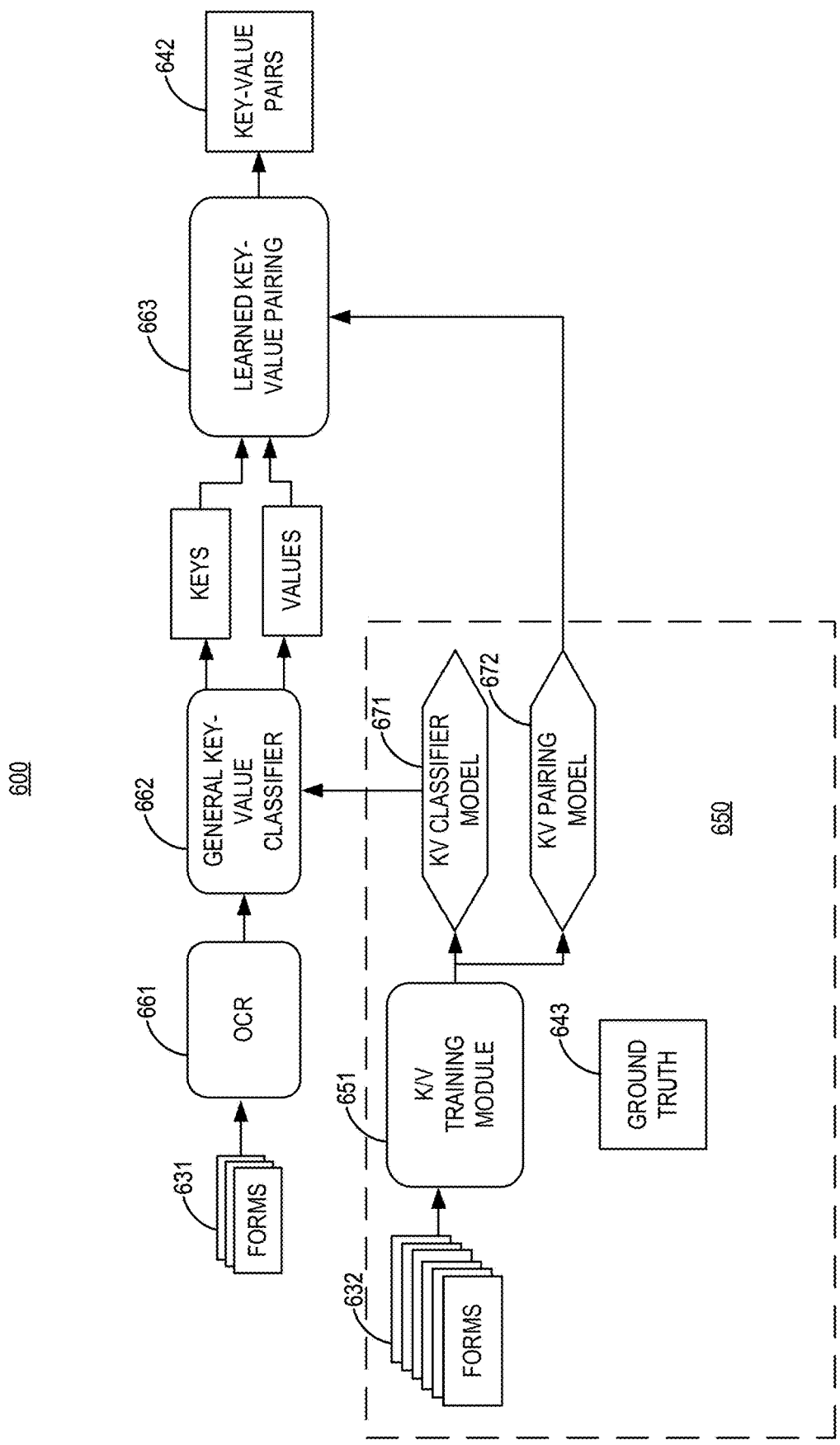
FIG. 6 is a functional block diagram illustrating an example system for form OCR key-value extraction of multiple new forms.

FIG. 6 is a functional block diagram illustrating an example system for form OCR key-value extraction of multiple new forms.

FIG. 6 is a functional block diagram illustrating an example system (600) for form OCR key-value extraction of multiple new forms (631), and a training pipeline 650. System 600 may include OCR block 661, general key-value classifier block 662, and key-value pairing block 663. Training pipeline 650 may include key-value training module 651.

Training pipeline 650 may perform a priori training based on generic forms 632. Generic forms 632 may be from any source, including generic forms found on the internet, or any other suitable source. In some examples, ground truth 643 includes a correct key-value pair for each of the forms in generic forms 632. In some examples, key-value training module 651 is configured to generate key-value classifier model 671 and key-value pairing model 672 from generic forms 632 and ground truth 643.

Training pipeline 650 may be different from than training pipelines discussed above for performing OCR and key-value determinations for a single form. The models output by training pipeline 650 are based on multiple forms as input in these examples. In these examples, training pipeline 650 does not generate models with rules based on types of forms, because there is no ground truth for the particular types of forms to be used, and the type of form to be used may not be known in advance.

However, the presence of multiple forms 631 may allow for factors to be used by the model to perform classification and to match key-value pairs that are not considered in the single form case. For example, the classification may also include anchor extraction from forms 631, including determining not just the probability that each line is a key and the probability that each line is a value, but also the probability that each line is an anchor. Anchors, in these examples, are fields that would appear in the empty form for the current form.

The models generated by training pipeline 650 may make use of form clustering and/or form classification on forms 631. For instance, in some examples, the form classification separates the forms 331 into different types of forms. In this way, separate analysis may be done on each type of form. In some examples, form clustering separate forms 631 into separate clusters. Word frequency analysis may be done separately on each cluster/type of form. The word frequency may include, in some examples, using a histogram to determine the frequency of each line for forms in the cluster. The word frequency analysis for each type of form may be used both in anchor extraction and feature extraction. Lines that frequently appear in a particular type of form, but which do not show up more then once per page, may make good candidates for anchors. Also, the fact that a line appears on multiple forms of the same type may indicate a greater probability that the line is a key.

OCR block 661 may be configured to perform OCR on forms 631. In some examples, general key-value classifier block 662 is configured to predict keys and values from OCR'ed forms 631. In some examples, general key-value classifier block uses a key list input by the user to assist in the classification. In other examples, no key list is provided by the user, and instead general key-value classifier block 662 predicts the keys. General key-value classifier block 662 is based on a general key-value classifier—general in that it is not specific to the type of form, but rather is based on a general form model trained based on generic forms. General key-value classifier block 662 may also make use of the word frequency analysis to predict which lines are values and which lines are keys.

In some examples, key-value pairing block 663 is configured to predict, for each key predicted by general key-value classifier block 662, the corresponding predicted value among the predicted values from general key-value classifier block 662, outputting the predicted key-value pairs 642. Key-value pairing block 663 may make the pairing from OCR'ed forms 631 based on a general key-value pairing mode. In some examples, general key-value classifier block 663 is based on a general key-value pairing model—general in that it is not specific to the type of form, but rather is based on a general form model trained based on generic forms.

Forms 631 are typically forms to all be processed by system 600; however, if the number of forms is small, previous forms may also be included to give a larger sample size of forms.

Figure 7:
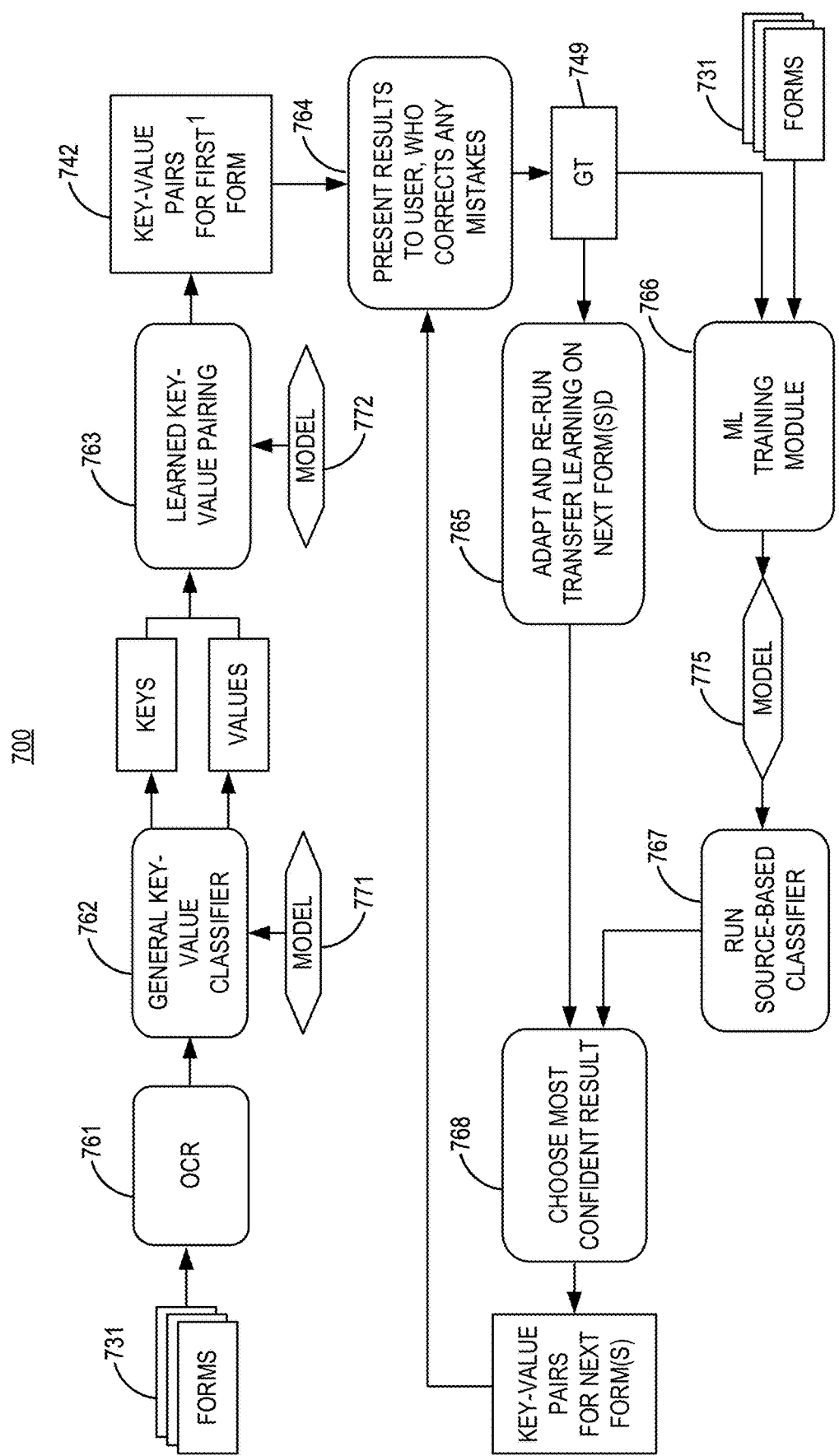
FIG. 7 is a functional block diagram illustrating an example system for form OCR unsupervised domain adaptation of multiple forms.

FIG. 7 is a functional block diagram illustrating an example system (700) for form OCR unsupervised domain adaptation of multiple forms (731) from the learned generic models of model (771) and model (772). System 700 may include OCR block 761, general key-value classifier block 762, key-value pairing block 763, result presentation block 764, adaptation block 765, machine learning training module block 766, source-model classifier block 767, and result selection block 768. In these examples, system 700 is unsupervised domain adaptation, in that the initial results come from a model that is trained on generic forms, but a small amount of user feedback is obtained on one or a few forms to adapt the system to this new domain.

OCR block 761 may be configured to perform OCR on forms 731. In some examples, general key-value classifier block 762 is configured to predict keys and values from OCR'ed forms 731 based on model 771. In some examples, general key-value classifier block 762 uses a key list input by the user to assist in the classification. In other examples, no key list is provided by the user, and instead general key-value classifier block 762 predicts the keys. In some examples, general key-value classifier block 762 is a based on a general form model 771 trained based on generic forms, but which may subsequently be updated based on user-provided feedback. In some examples, model 771 may also include a language model that is pre-trained based on general text. In some examples, model 771 of general key-value classifier block 762 also makes use of the word frequency analysis to determine which lines are values and which lines are keys.

In some examples, key-value pairing block 763 is configured to predict, based on model 772, for each key predicted by general key-value classifier block 762, the corresponding predicted value among the predicted values from general key-value classifier block 762, outputting the predicted key-value pairs 742. Key-value pairing block 762 may make the pairing from OCR'ed forms 731 based on a general key-value pairing mode trained based on generic forms, but which may subsequently be updated based on user-provided feedback.

Block 763 may generate key value pairs for a first form from among forms 731 as results, or the first few forms of forms 731, which may then be presented to a user by Presentation block 764. In these examples, any verification or correction made by the user based on the presented results acts as a ground truth 749 for applying a source-data model. Ground truth 749 and forms 731 may be used by machine learning training module 765 to generate a source-data model 775 for determining key-value pairs. Unlike the transfer-learning-based models based on generic forms, source-data model 775 may take into account the particular types of form(s) for which a ground truth is available based on user feedback. In these examples, if the user indicates that a key-value pair is correct, then that key-value pair is part of the ground truth for the corresponding form. If the user indicates that the key-value pair is incorrect, and provides a different key-value pair as the correct key-value pair, then, in these examples, the correct key-value pair provided by the user is part of the ground truth for the corresponding form.

On subsequent forms, after a source-data model 775 has been trained based on user feedback for one or more forms, system 700 may perform in a similar manner, with source-model classifier block 767 also being used generate a result, along with the results being adapted and re-run based on the forms by adaption block 767. In some examples, the results from source-model classifier block 767 and adaptation block 765 are each accompanied by probabilities that the result is correct. Results comparison block 768 may then output the result with the highest probability as the corresponding output result. The output result may then be provided to the user for user feedback for additional training in developing the source-model classifier model 775. In this way, the model may be enhanced over time. At some point, the user or the system may stop asking for user feedback in the results, such as upon mistakes being low, or at another suitable time.

Illustrative Process

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

Figure 8A:
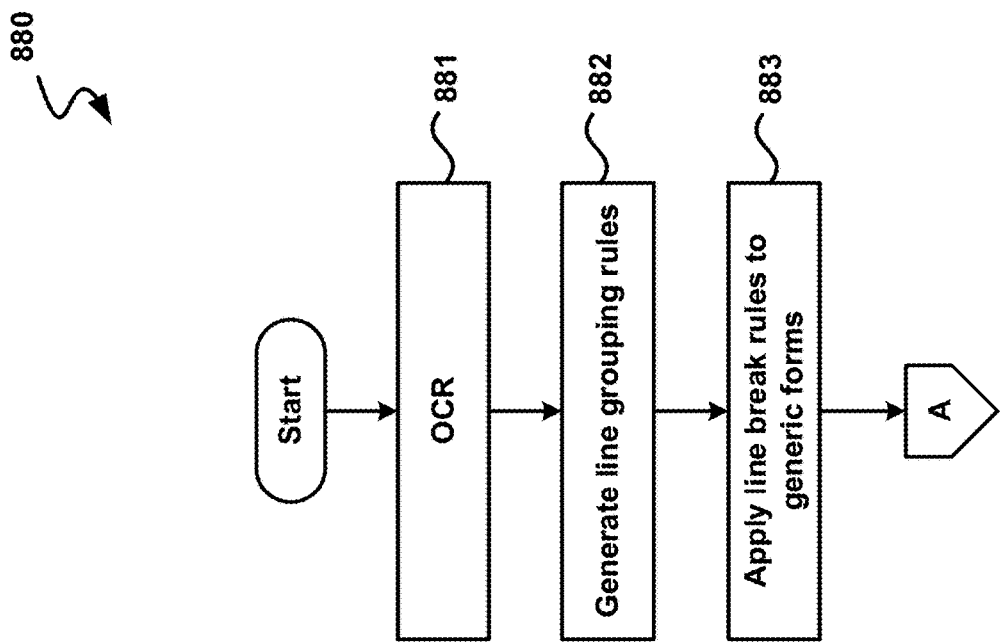
FIGS. 8A-8B illustrate a flow diagram of an example of a training process for form OCR key-value extraction.
Figure 8B:
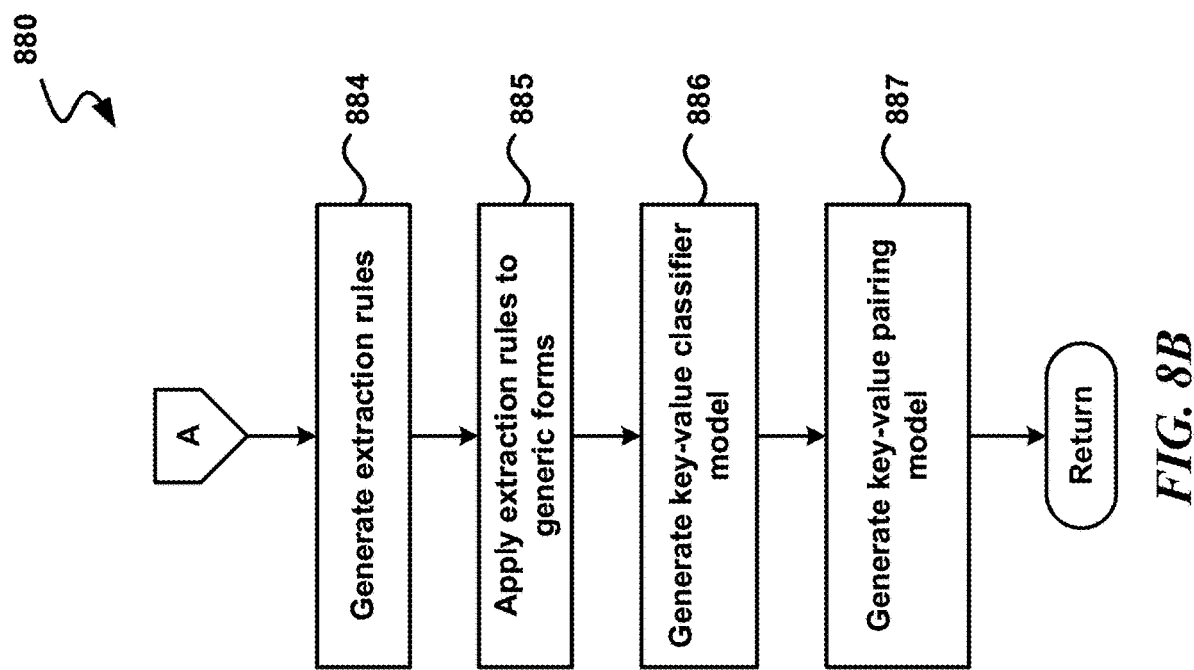

FIGS. 8A-8B illustrate an example dataflow for a process (880) for training. In some examples, process 880 is performed by a device, such as device 200 of FIG. 2, or the training pipeline of FIG. 4, FIG. 5, or FIG. 6.

In the illustrated example, step 881 occurs first. At step 881, in some examples, optical text recognition is performed on a plurality of generic forms. As shown, step 882 occurs next in some examples. At step 882, in some examples, line grouping rules are generated based on the plurality of generic forms and a ground truth for the plurality of generic forms. In some examples, the ground truth includes, for each form of the plurality of forms, key-value pairs for the form. As shown, step 883 occurs next in some examples. At step 883, in some examples, line groupings are applied to the plurality of generic forms based on the line grouping rules.

As shown, step 884 occurs next in some examples. At step 884, in some examples, feature extraction rules are generated based on the plurality of generic forms and the ground truth for the plurality of generic forms. As shown, step 885 occurs next in some examples. At step 885, in some examples, features are extracted from the plurality of generic forms based on the feature extraction rules.

As shown, step 886 occurs next in some examples. At step 886, in some examples, a key-value classifier model is generated based on the extracted features, the plurality of generic forms, the applied line groupings, and the ground truth for the plurality of forms, such that the key-value classifier model is configured to determine, for each line of a form: a probability that the line is a value, and a probability that the line is a key. As shown, step 887 occurs next in some examples. At step 887, in some examples, a key-value pairing model is generated based on the extracted features, the plurality of generic forms, the applied line groupings, and the ground truth for the plurality of forms, such that the key-value pairing model is configured to predict, for each key in a form, which value in the form corresponds to the key. The process may then proceed to the return block, where other processing is resumed. In some examples, some of the steps illustrated in FIG. 8 are combined steps rather than discrete steps. For instance, in some example, steps 882-886 are performed together are one steps rather than being performed as discrete steps; in these examples, line grouping and feature extraction may both be performed on the OCR'ed text, with the model receiving OCR text and outputting lines for a form, with each line in the form including a probability that the line is a value, and the probability that a line is a key.

Figure 9A:
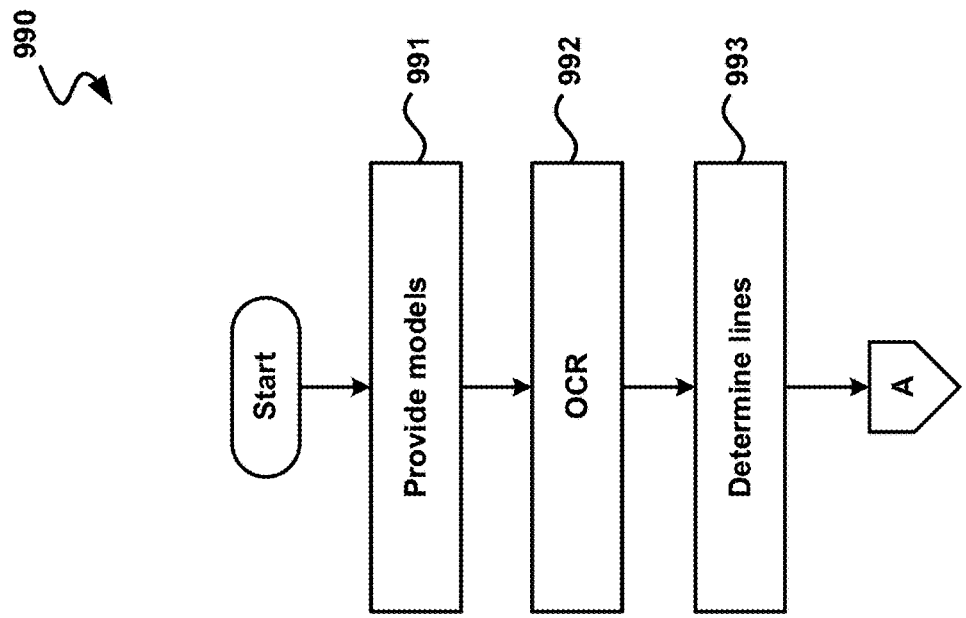
FIGS. 9A-9B illustrate a flow diagram of an example of a process for form OCR key-value extraction, in accordance with aspects of the present disclosure.
Figure 9B:
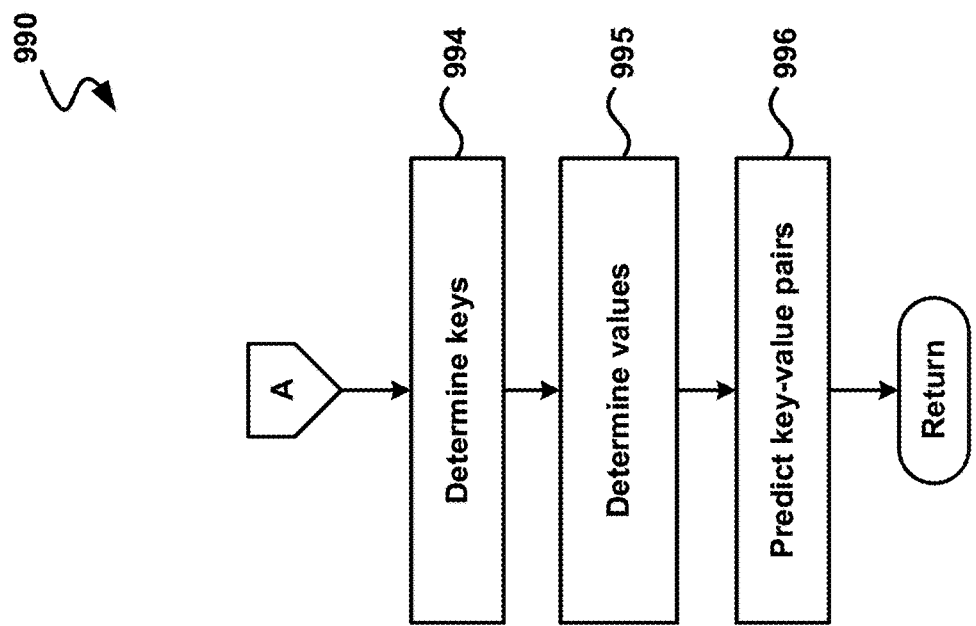

FIGS. 9A-9B illustrate an example dataflow for a process (990). In some examples, process 990 is performed by a device, such as device 200 of FIG. 2, FIG. 3, FIG. 4, FIG. 6, or FIG. 7.

In the illustrated example, step 991 occurs first. At step 991, in some examples, a key-value classifier model and a key-value pair model are provided based on training on generic forms. As shown, step 992 occurs next in some examples. At step 992, in some examples, optical text recognition is performed on an input form. As shown, step 993 occurs next in some examples. At step 993, in some examples, a plurality of lines is determined from the input form based on the key-value classifier model.

As shown, step 994 occurs next in some examples. At step 994, in some examples, based on the key-value classifier model, which lines of the plurality of lines are likely to be keys is determined. As shown, step 995 occurs next in some examples. At step 995, in some examples, based on the key-value classifier model, which lines of the plurality of lines are likely to be values is determined. As shown, step 996 occurs next in some examples. At step 996, in some examples, key-value pairs for the input form are predicted via at least one processor based the key-value pair model. The process may then proceed to the return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
a device including at least one memory adapted to store run-time data for the device, and at least one processor that is adapted to execute processor-executable code that, in response to execution, enables the device to perform actions, including:
performing optical text recognition on a plurality of generic forms;
generating line grouping rules based on the plurality of generic forms and a ground truth for the plurality of generic forms, wherein the ground truth includes, for each form of the plurality of forms, key-value pairs for the form;
applying line groupings to the plurality of generic forms based on the line grouping rules;
generating feature extraction rules based on the plurality of generic forms, based, at least in part, on the ground truth for the plurality of generic forms;
extracting features from the plurality of generic forms based on the feature extraction rules;
generating a key-value classifier model based on the extracted features, the applied line groupings, and the ground truth for the plurality of forms, such that the key-value classifier model is configured to determine, for each line of a form: a probability that the line is a value, and a probability that the line is a key; and
generating a key-value pairing model based on the extracted features, the plurality of generic forms, the applied line groupings, and the ground truth for the plurality of forms, such that the key-value pairing model is configured to predict, for each key in a form, which value in the form corresponds to the key.

2. The apparatus of claim 1, wherein the key-value classifier model is further configured to perform classification based on a received key list, wherein the received key list includes a list of keys for which values corresponding to the keys are to be predicted.

3. The apparatus of claim 1, wherein the generated feature extraction rules include extraction rules associated with syntactic information associated with text in the plurality of forms, the generated extraction rules include rules associated with graph-based local information in the plurality of forms, the generated extraction rules include rules associated with at least one heuristic rule applied to the plurality of forms, and the generated extraction rules include rules associated with visual features associated with the plurality of forms.

4. The apparatus of claim 1, wherein the line grouping rules are configured to perform line groupings based on a single form, the feature extraction rules are configured to extract features based on a single form, and wherein the key-value classifier model is configured to provide key-value classification based on a single form and the key-value pairing model is configured to provide key-value pairing based on a single form.

5. The apparatus of claim 1, wherein the key-value classifier model is configured to provide key-value classification based on a plurality of forms.

6. The apparatus of claim 5, wherein the key-value classifier model is further configured to perform form clustering on the forms of the plurality of form such that the forms of the plurality of forms are classified into separate clusters of forms, and for each cluster of forms, to use word frequency analysis as part of the key-value classifier determination.

7. The apparatus of claim 5, the actions further including presenting results to a user, receiving feedback from the user based on the presented results, and providing an updated classification model based on the received feedback.

8. The apparatus of claim 5, wherein the key-value classifier model is further configured to determine, for each line in a form, the probability that the line is an anchor.

9. A method, comprising:
providing line grouping rules based on a plurality of generic forms and a ground truth for the plurality of generic forms, wherein the ground truth includes, for each form of the plurality of forms, key-value pairs for the form;
applying line groupings to the plurality of generic forms;
providing feature extraction rules based on the plurality of generic forms and the ground truth for the plurality of generic forms;
extracting features from the plurality of generic forms;
creating a key-value classifier model based on the extracted features, the plurality of generic forms, and the ground truth for the plurality of forms, such that the key-value classifier model is configured to determine, for each line of a form: a probability that the line is a value, and a probability that the line is a key; and
creating a key-value pairing model based on the extracted features, the plurality of generic forms, the applied line groupings, and the ground truth for the plurality of forms, such that the key-value pairing model is configured to predict, for each key in a form, which value in the form corresponds to the key.

10. The method of claim 9, wherein the key-value classifier model is further configured to perform classification based on a received key list, wherein the received key list includes a list of keys for which values corresponding to the keys are to be predicted.

11. A method, comprising:
providing a key-value classifier model and a key-value pair model based on training on generic forms;
performing optical text recognition on at least one input form;
determining a plurality of lines from the at least one input form based on the key-value classifier model;
determining, based on the key-value classifier model, which lines of the plurality of lines are likely to be keys;
determining, based on the key-value classifier model, which lines of the plurality of lines are likely to be values; and
via at least one processor, predicting key-value pairs for at least one the input form based the key-value pair model.

12. The method of claim 11, wherein determining which lines are likely to be keys is further based on an input key list.

13. The method of claim 11, wherein the key-value classifier model is further configured to perform line groupings based on line grouping rules, wherein the line grouping rules are based on the generic forms.

14. The method of claim 11, wherein the key-value classifier model is further configured to extract features based on feature extraction rules, and wherein the feature extraction rules are based on the generic forms.

15. The method of claim 11, wherein the at least one input form is a single form, wherein the key-value classifier model is configured for a single form, and wherein the key-value pair model is configured for a single form.

16. The method of claim 11, wherein the at least one input form includes a plurality of forms, wherein the key-value classifier model is configured for a plurality of forms, and wherein the key-value pair model is configured for a plurality of forms.

17. The method of claim 16, wherein the key-value classifier model is further configured to perform form clustering on the forms of the plurality of forms such that the forms of the plurality of forms are classified into separate clusters of forms, and for each cluster of forms, to use word frequency analysis as part of the key-value classifier determination.

18. The method of claim 16, wherein the key-value classifier model is further configured to perform clustering on the forms of the plurality of forms such that the forms of the plurality of forms are classified into separate clusters of forms, to perform word frequency analysis on each separate cluster of forms, and to predict anchors based on the word frequency analysis.

19. The method of claim 16, wherein the key-value classifier model is further configured to perform clustering on the forms of the plurality of forms such that the forms of the plurality of forms are classified into separate clusters of forms, and to perform word frequency analysis on each separate cluster of forms, wherein the feature extraction is further based on the word frequency analysis.

20. The method of claim 16, further comprising presenting results to a user, receiving feedback from the user based on the presented results, and providing an updated classification model based on the received feedback.

* * * * *